(12) United States Patent
Matsubara

(10) Patent No.: US 7,222,250 B2
(45) Date of Patent: May 22, 2007

(54) DISPLAY UNIT AND POWER SAVE CONTROLLER

(75) Inventor: Satoshi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 10/972,379

(22) Filed: Oct. 26, 2004

(65) Prior Publication Data

US 2005/0086552 A1    Apr. 21, 2005

Related U.S. Application Data

(63) Continuation of application No. PCT/JP02/06360, filed on Jun. 25, 2002.

(51) Int. Cl.
G06F 1/00 (2006.01)
G06F 1/32 (2006.01)

(52) U.S. Cl. ..................... 713/320; 713/324

(58) Field of Classification Search ............ 713/300, 713/320, 323, 324

See application file for complete search history.

(56) References Cited

U.S. PATENT DOCUMENTS

| | | | |
|---|---|---|---|
| 7,000,127 B2 * | 2/2006 | D'Alessio | 713/320 |
| 7,031,463 B2 * | 4/2006 | Pierce | 379/413 |
| 2005/0010829 A1 * | 1/2005 | Choi et al. | 713/300 |

FOREIGN PATENT DOCUMENTS

| | | |
|---|---|---|
| JP | 7-306665 | 11/1995 |
| JP | 11-282445 | 10/1999 |
| JP | 11296265 A * | 10/1999 |
| JP | 2000-250506 | 9/2000 |

* cited by examiner

*Primary Examiner*—Chun Cao
*Assistant Examiner*—Mark Connolly
(74) *Attorney, Agent, or Firm*—Staas & Halsey LLP

(57) ABSTRACT

An object of the present invention is to provide a display unit and a power save controller capable of reducing the power consumption in a power save mode. There are provided a power supply section 110 which supplies power to a display unit 100 connected to a computer main unit 200 to display images, a display section 120 which performs image display on the basis of an image signal, a power save control section 130 which controls, on the basis of a sync signal, an energization mode in which the power supply section 110 is in an on state and a power save mode in which the power supply section 110 is in an off state, and a power save termination determination circuit 140 which is driven by auxiliary power for peripheral devices supplied from the computer main unit 200, which substitutes as the power save control section 130 to make a determination on the basis of the sync signal as to whether or not a return from the power save mode to the energization mode should be made, and returns at least the power save control section 130 to the on state in the case of determining that a return to the energization mode should be made, and which has a power consumption lower than that of the power save control section 130.

3 Claims, 4 Drawing Sheets

DISPLAY UNIT AND POWER SAVE CONTROLLER

This application is a continuing application, filed under 35 U.S.C. §111(a), of International Application PCT/JP02/06360, filed Jun. 25, 2002.

TECHNICAL FIELD

The present invention relates to a display unit connected to a computer main unit to display images, and to a power save controller for use with the display unit.

BACKGROUND ART

In display units connected to computer main units to display images, conventionally, a display unit designed to save power in such a manner that the display units enters a power save mode of a low power consumption if the computer is not used in a predetermined time period after turning on of the power to the display unit has been put to practical use.

However, conventional display units consume power of typically 3 to 5 W even in a power save mode.

The tendency is now increasing on a worldwide scale to reduce the power consumption of display units in a power save mode to 1 W or less from the viewpoint of environmental protection and resource conservation. However, it is presently difficult to reduce the power consumption to such a level, for a reason described below.

In present display units, a microcomputer having the important functions that display optimum on-screen images, e.g., the function of controlling display parameters and the function of detecting a screen adjustment function button input signal is used. A power save control circuit constituted mainly of this microcomputer performs control in a power save mode.

Therefore, supply of power to the save control circuit constituted mainly of the microcomputer is also required in the power save mode. Presently, for this reason, consumption of power of 3 to 5 W at the minimum cannot be avoided.

In view of the above-described circumstances, an object of the present invention is to provide a display unit having a reduced power consumption in a power save mode and a power save controller for use with the display unit.

DISCLOSURE OF THE INVENTION

A display unit provided to achieve the above-described object is a display unit connected to a computer main unit to display images and having:

a power supply section which supplies power to the display unit;

a display section which performs image display on the basis of an image signal supplied from the computer main unit;

a power supply control section which controls, on the basis of a sync signal contained in the image signal, switching between an energization mode in which the power supply section is in an on state and a power save mode in which the power supply section is in an off state; and a power save termination determination circuit which is driven by auxiliary power for peripheral devices supplied from the computer main unit, which substitutes as the power save control section to make a determination on the basis of the sync signal as to whether or not a return from the power save mode to the energization mode should be made, and returns at least the power save control section to the on state in the case of determining that a return to the energization mode should be made, and which has a power consumption lower than that of the power save control section.

In the display unit of the present invention, the power save termination determination circuit substitutes as the power save control section to detect a command for return to the energization mode. Therefore, the power save control section that consumes power even in the power save mode in the conventional technique does not require power supply in the power save mode. Consequently, the power consumption of the display unit in the power save mode is markedly reduced in comparison with that in the conventional system.

It is preferred that the above-described power save termination determination circuit should return the power save control section to the on state by the auxiliary power while maintaining the power supply section in the off state, and that when the power save control section is returned to the on state by the auxiliary power, it should again make a determination as to whether or not a return from the power save mode to the energization mode should be made, return the power supply section to the on state in the case of determining that a return to the energization mode should be made, and cancel the return to the on state by the auxiliary power in the case of determining that the power save mode should be continued.

If the display unit of the present invention is arranged as described above, it is not necessary for the circuit for determination of power save termination to have a function for strict determination, and power save termination determination can be made with a simple circuit.

A power save controller provided to achieve the above-described object is a power save controller used in a display unit having a display section which performs image display on the basis of an image signal supplied from a computer main unit, and a power supply section which supplies power, the power save controller controlling switching between an energization mode in which the power supply section is in an on state and a power save mode in which the power supply section is in an off state, the power save controller having:

a power save control section which controls switching between the energization mode and the power save mode on the basis of a sync signal contained in the image signal; and a power save termination determination circuit which is driven by auxiliary power for peripheral devices supplied from the computer main unit, which substitutes as the power save control section to make a determination on the basis of the sync signal as to whether or not a return from the power save mode to the energization mode should be made, and returns at least the power save control section to the on state in the case of determining that a return to the energization mode should be made, and which has a power consumption lower than that of the power save control section.

In the power save controller of the present invention, the power save termination determination circuit substitutes as the power save control section to detect a command for return to the energization mode. Therefore, the power save control section that consumes power even in the power save mode in the conventional technique does not require power supply in the power save mode. Consequently, the power consumption in the power save mode of the display unit using the power save controller of the present invention is markedly reduced in comparison with that in the conventional system.

According to the present invention, as described above, a display unit and a power save controller capable of reducing the power consumption in the power save mode can be implemented.

BEST MODE FOR CARRYING OUT THE INVENTION

Embodiments of the present invention will be described.

Figure 1:
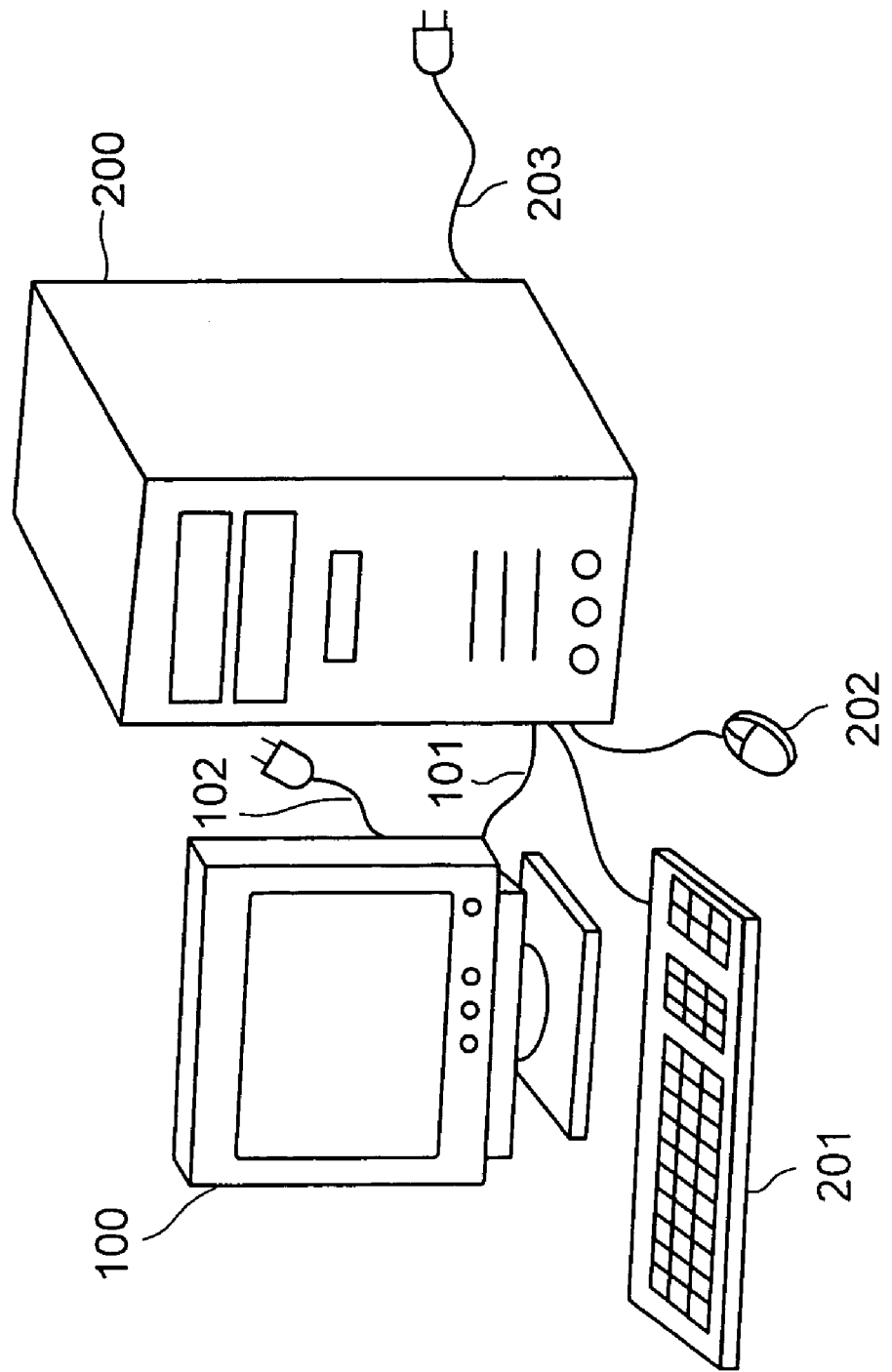
FIG. 1 is a diagram schematically showing a computer system to which a display unit in one embodiment of the present invention is connected.

FIG. 1 is a diagram schematically showing a computer system to which a display unit in one embodiment of the present invention is connected.

As shown in FIG. 1, this display unit 100 is connected to a computer main unit 200 by a display signal cable 101 to display images. Alternating-current power is supplied to the display unit 100 through an alternating-current power supply cable 102.

A keyboard 201 and a mouse 202 or the like that supply a command input by an operator to the computer main unit 200 are connected to the computer main unit 200 in addition to the display unit 100.

An alternating-current power is also supplied to the computer main unit 200 through an alternating-current power supply cable 203.

Figure 2:
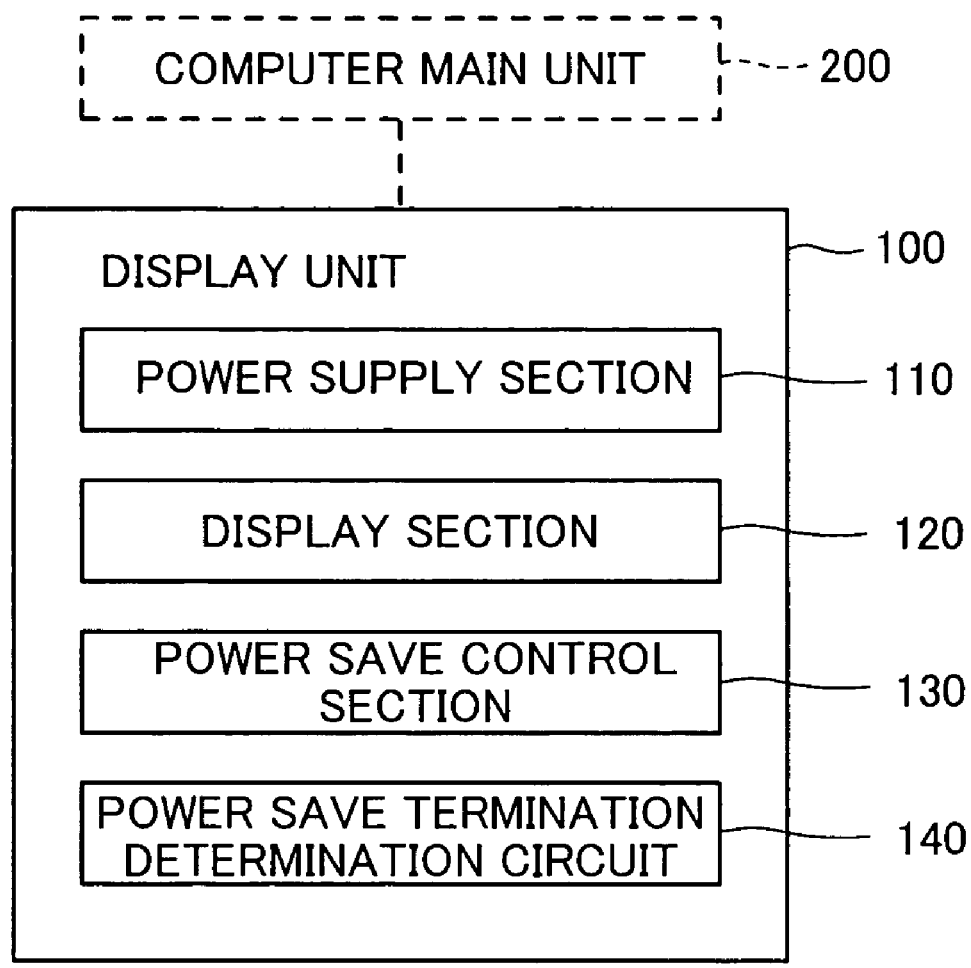
FIG. 2 is a diagram schematically showing the configuration of an embodiment of the display unit of the present invention.

FIG. 2 is a diagram schematically showing the configuration of an embodiment of the display unit of the present invention.

As shown in FIG. 2, the display unit 100 is a display unit connected to the computer main unit 200 to display images and having a power supply section 110, a display section 120, a power save control section 130 and a power save termination determination section 140.

Through the power supply section 110, power is supplied to the display unit 100. The display section 120 displays images on the basis of an image signal supplied from the computer main unit 200. The power save control section 130 controls, on the basis of the above-described sync signal, switching between an energization mode in which the power supply section 110 is in an on state and a power save mode in which the power supply section 110 is an off state. The power save termination determination section 140 is driven by auxiliary power for peripheral devices supplied from the computer main unit 200, and substitutes as the power save control section 130 to make a determination on the basis of the sync signal whether or not a return from the power save mode to the energization mode should be made.

In the display unit 100 in this embodiment, when the power save termination determination section 140 determines that a return to the energization mode should be made, it returns the power save control section 130 to the on state by auxiliary power while maintaining the power supply section 110 in the off state. When the power save control section 130 is returned to the on state by auxiliary power, it again makes a determination on the basis of the sync signal as to whether or not a return from the power save mode to the energization mode should be made. When determining that a return to the energization mode should be made, the power save control section 130 returns the power supply section 110 to the on state. When determining that the power save mode should be continued, the power save control section 130 cancels the return to the on state by auxiliary power.

Figure 3:
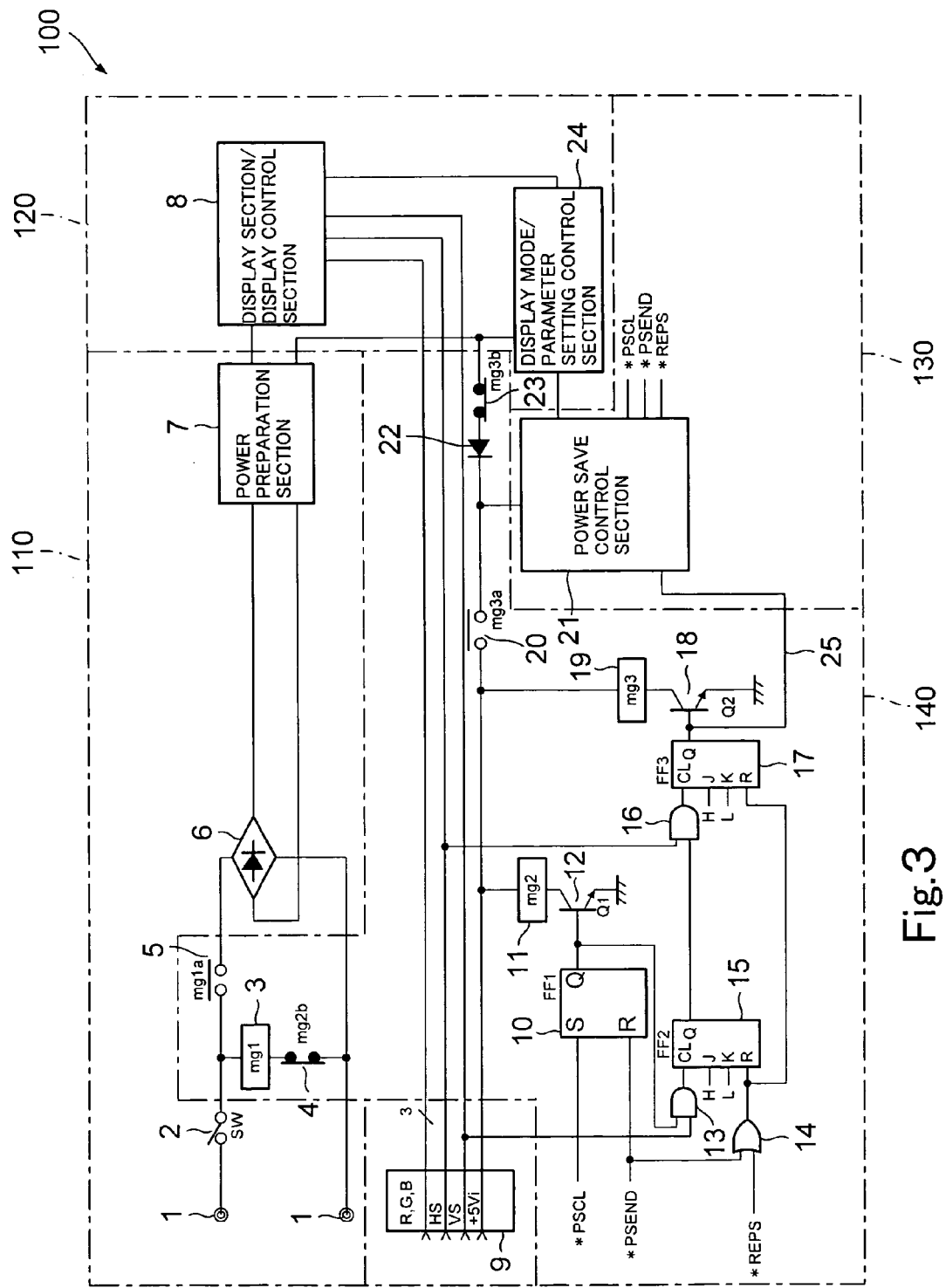
FIG. 3 is a circuit diagram of the display unit in the embodiment.

FIG. 3 is a circuit diagram of the display unit in this embodiment.

As shown in FIG. 3, the display unit 100 has: an alternating-current input terminal 1 that inputs alternating-current power; a power switch 2 with which alternating-current power is turned on/off; a rectifier 6 which rectifies alternating-current power; a power preparation section 7 which prepares streams of control power used in the sections of the display unit; a VGA (Video Graphics Array) connector 9 through which the image signal and auxiliary power for peripheral devices supplied from the computer main unit are received; a display section/display control section 8 which performs image display on the basis of the image signal formed of R (red), G (green) and B (blue) video signals, an HS (horizontal sync) signal and a VS (vertical sync) signal and supplied from the computer main unit via the VGA connector 9; a display mode/parameter setting control section 24 which sets and controls a display mode and parameters for image display; a power save control section 21 which controls, based on the sync signal, switching between the energization mode in which the power supply section 110 is in the on state and the power save mode in which the power supply section 110 is in the off state; and a power save termination determination circuit 140.

In this embodiment, a power supply incorporating a +5 V terminal from the VGA connector 9 is used as a power supply for peripheral devices.

The embodiment will be described by assuming, for ease of explanation, that only one power save mode described above exists.

The alternating-current input terminal 1, the power supply switch 2, the rectifier 6 and the power preparation section 7 in this display unit 100 correspond to an example of the power supply section referred to with respect to the present invention. The display section/display control section 8 and the display mode/parameter setting control section 24 in this display unit 100 corresponds to an example of the display section referred to with respect to the present invention.

The power save termination determination circuit 140 is constituted by a coil 3 of a first relay mg1, a b contact 4 of a second relay mg2, an a contact 5 of the first relay mg1, a first flip flop 10, a coil 11 of the second relay mg2, a first transistor 12, a first AND gate 13, an OR gate 14, a second flip flop 15, a second AND gate 16, a third flip flop 17, a second transistor 18, a coil 19 of a third relay mg3, an a contact 20 of the third relay mg3, a reverse current preventing diode 22 and a b contact 23 of the third relay mg3.

This power save termination determination circuit 140 is arranged so as to operate at a power consumption lower than that at which the power save control section 130 operates.

In the display unit in this embodiment, a mechanical relay having a coil and contacts is used as each of the first relay mg1, the second relay mg2 and the third relay mg3.

The operation of the display unit in this embodiment will now be described.

The initial operation of this display unit 100 will first be described. "Initial operation" denotes the operation of the display unit 100 when the display unit 100 is connected to the computer unit via the VGA connector 9 and when the power for the computer main unit is turned on while the power switch 2 of the display unit 100 is in the off state.

The display unit 100 is supplied with the image signal formed of R (red), G (green) and B (blue) video signals, an HS (horizontal sync) signal and a VS (vertical sync) signal and auxiliary power at +5 V for peripheral devices from the computer main unit via the VGA connector 9. Even when the power supply section 110 is in the off state, the power save termination determination circuit 140 operates by auxiliary power supplied via the VGA connector 9.

An output Q of the first flip flop 10 of the power save termination determination circuit 140 is maintained at level 0 as long as a *PSCL (power save clock) signal from the power save control section 21 is not received. In this state, therefore, the first transistor 12 and the coil 11 of the second relay mg2 do not operate and the b contact 4 of the second relay mg2 is maintained in the connected state. The *PSCL signal is a signal for a command that makes the first flip flop 10 of the power save termination determination circuit 140 initiate switching to the power save mode.

In the power save termination determination circuit 140, the output Q of the first flip flop 10 and the VS (vertical sync signal) from the VGA connector 9 are input to the first AND gate 13. Since the output Q of the first flip flop 10 is level 0, the output of the first AND gate 13 is 0 level. This output is input to a clock terminal CL of the second flip flop 15. An output 0 of the second flip flop 15 is therefore level 0. This output Q and the HS (horizontal sync signal) from the VGA connector 9 are input to the second AND gate 16 to produce a level-0 output which is input to a clock terminal CL of the third flip flop 17.

An output Q of the third flip clop 17 is thereby made level 0 and, therefore, the second transistor 18 and the coil 19 of the third relay mg3 do not operate. The a contact 20 and the b contact 23 of the third relay mg3 are thereby set in the disconnected state and the connected state, respectively. Consequently, the power save control section 21 can be supplied with power from the power preparation section 7 via the b contact 23 of the third relay mg3.

In this initial operation, a level-0 power save return signal 25 output from the third flip flop 17 is input to the power save control section 21.

The operation of the display unit 100 from turning-on of the power switch 2 of the display unit 100 to the time at which the display unit 100 enters the power save mode will next be described.

When the power switch 2 is turned on in the state where the power save control unit 21 can be supplied with power from the power preparation section 7 via the b contact 23 of the third relay mg3, the coil 3 of the first replay mg1 operates by alternating-current power supplied from the alternating-current input terminal 1 since the b contact 4 of the second relay mg2 is in the connected state as mentioned above. The a contact 5 of the first relay mg1 is thereby connected to supply alternating-current power from the alternating-current input terminal 1 to the power preparation section 7 through the rectifier 6. Streams of control powers are thereby produced in the power preparation section 7.

One stream of control power prepared in the power preparation section 7 is supplied to the display section/display control section 8 and the display mode/parameter setting control section 24, and another stream of power prepared in the power preparation section 7 is supplied to the power save control section 21 via the b contact 23 of the third relay mg3 and the reverse current preventing diode 22, thereby enabling the display unit to operate for display. The power save control section 21 sends out reset signals that reset at the time of power-on to perform setting, resetting, initialization and the like of various registers and so on.

When the video signals R, G, and B, the horizontal sync signal HS and the vertical sync signal VS are supplied from the computer main unit 200 (see FIG. 2) via the VGA connector 9, the power save control section 21 makes a determination on the basis of the horizontal sync signal HS and the vertical sync signal VS as to whether transition to the power save mode should be made or the energization mode should be continued, and further makes a determination as to whether or not the level of the power save return signal 25 is designating a return from the power save mode to the energization mode. Since in this case the power save return signal 25 is level 0 as mentioned above, the power save control section 21 determines that a return from the power save mode to the energization mode will not be made, determines the display mode, and sends out optimum display parameters to the display section/display control section 8 via the display mode/parameter setting control section 24.

The display section/display control section 8 is supplied with the video signals and the sync signals from the VGA connector 9 and performs image display on the basis of the optimum display parameters sent from the display mode/parameter setting control section 24.

The operation of the display unit 100 at the time of switching from the energization mode to the power save mode will next be described.

In the computer main unit 200 (see FIG. 2), sending out of both the horizontal sync signal and the vertical sync signal from the computer main unit 200 is stopped in a case where the computer is not used in a time period equal to or longer than a predetermined time period. This is carried out as a command that makes the display unit 100 (see FIG. 2) change from the energization mode to the power save mode.

An example of the command from the computer 200 to change to the power save mode by stoppage of sending out of both the horizontal sync signal and the vertical sync signal in this example has been described. However, the present invention is not limited to this example. Sending out of one of the horizontal sync signal and the vertical sync signal may be stopped as a command for change to the power save mode.

In the case of the conventional display unit, supply of power to the power supply section to the display section/display control section is stopped on the display unit side when a command for change to the power save mode is received from the computer main unit. In this event, however, the power supply section is still in the on state and continues supplying power to the display mode/parameter setting control section and the power save control section through the rectifier and the power supply section. In this state, the operation that detects the horizontal sync signal and the vertical sync signal is started and sending of a command for return to the power save mode from the computer main unit is awaited.

In the display unit 100 in this embodiment, the power save control section 21 determines the command for change to the power save mode is received from the computer main unit when detecting stoppage of the horizontal sync signal and the vertical sync signal from the computer main unit 100 and inputs the *PSCL signal to a setting terminal S of the first flip flop 10 of the power save termination determination circuit 140. The output Q of the first flip flop 10 is thereby changed to level 1 to turn on the first transistor 12. The coil 11 of the second relay mg2 is thereby set in the energized state to disconnect the b contact 4 of the second relay mg2.

The coil 3 of the first relay mg1 is thereby set in the non-energized state to disconnect the a contact 5 of the first relay mg1. Supply of power to the rectifier 6 and other subsequent sections is thereby stopped to effect a transition to the power save mode. In this state, power supply from the power supply section 110 becomes zero.

When the vertical sync signal VS is sent from the computer main unit to the first AND gate 13 via the VGA connector 9, the first AND gate 13 allows the vertical sync signal VS to pass therethrough since the output Q of the first flip flop 10 becomes level 1, thereby inputting the vertical sync signal to the clock terminal CL of the second flip flop 15.

The display unit 100 maintains the above-described state as long as the command for return from the power save mode to the energization mode is not sent from the computer main unit.

The operation of the display unit 100 at the time of return from the power save mode to the energization mode will next be described.

When the computer main unit 200 (see FIG. 2) detects a certain event, e.g., an input operation using the keyboard or a pointing operating using the mouse, both the horizontal sync signal and the vertical sync signals are sent out from the computer main unit 200 as a command to return the display unit 100 from the power save mode to the energization mode.

The conventional display unit is arranged so that when the power save control unit detects a command from the computer main unit for return to the energization mode, it determines that a return from the power save mode to the energization mode should be made and starts the operation for return to the energization mode.

In the display unit in this embodiment, no power is supplied to the power save control section 21 and, therefore, the power save control section 21 cannot operate when the horizontal sync signal HS and the vertical sync signal VS arrive at the VGA connector 9. However, the display unit 100 in this embodiment is arranged so that the power save termination determination circuit 140 substitutes as the power save control section 21 to make a determination on the basis of the sync signals whether or not a return from the power save mode to the energization mode should be made, and that when the power save termination determination circuit 140 determines that a return to the energization mode should be made, it returns the power save control section 21 to the on state.

That is, when the horizontal sync signal HS and the vertical sync signal VS from the computer main unit arrive at the VGA connector 9, the first AND gate 13 of the power save termination determination circuit 140 allows the vertical sync signal VS to pass therethrough since the output Q of the first flip flop 10 is maintained at level 1 at this time. The vertical sync signal VS is thereby output to the clock terminal CL of the second flip flop 15. The output Q of the second flip flop 15 is thereby changed to level 1 and is input to the second AND gate 16. Since the horizontal sync signal HS is also input to the second AND gate 16, the output of the second AND gate 16 is input to the clock terminal CL of the third flip flop 17 to change the output Q of the third flip flop 17 to level 1. The second transistor 18 is turned on by the output Q of the third flip flop 17 to set the coil 19 of the third relay mg3 in the energized state, thereby disconnecting the b contact 23 of the third relay mg3 and connecting the a contact 20 of the third relay mg3. The output Q of the third flip flop 17 is also input as the power save return signal 25 to the power save control section 21 to be used as a determination signal at the time of return from the power save mode to the energization mode described below.

The a contact 20 of the third relay mg3 is thus connected to supply +5 V auxiliary power to the power control section 21 via the VGA connector 9 from the computer main unit, thereby returning the power control section 21 to the on state. Since the connection through the b contact 23 of the third relay mg3 is established and since the reverse current preventing diode 22 exists, +5 V auxiliary power is supplied only to the power save control section 21.

That is, the display unit 100 in this embodiment is arranged so that when the power save termination determination circuit 140 determines that a return to the energization mode should be made, it returns the power save control section 21 to the on state by auxiliary power while maintaining the power supply section 110 in the off state. The display unit 100 in this embodiment is also arranged so that when the power save control section 21 is returned to the on state by auxiliary power, it again makes a determination on the basis of the sync signals as to whether or not a return from the power save mode to the energization mode should be made, returns the power supply section 110 to the on state in the case of determining that a return to the energization mode should be made, and cancels the return to the on state by auxiliary power in the case of determining that the power save mode should be continued.

That is, in a case where the result of determination by the power save termination determination circuit 140 constituted by the second flip flop 15 and the third flip flop 17 is not correct, the power save control section 21 outputs a *REPS (reset power save) signal that cancels the return of the power save control section 21 to the on state by resetting the power save termination determination circuit 140.

For example, in a case where while the output Q of the third flip flop 17 is level 1, the horizontal sync signal and vertical sync signal constant in level are not supplied with stability during a predetermined time period after detection of the horizontal sync signal and vertical sync signal, the power save control section 21 outputs the *REPS signal. In the power save termination determination circuit 140 receiving the *REPS signal, the second flip flop 15 and the third flip flop 17 are reset by the output of the OR gate 14; the second transistor 18 is turned off; the coil 19 of the relay mg3 is set in the non-energized state; the b contact 23 of the third relay mg3 is connected; and the a contact 20 of the third relay mg3 is disconnected, thereby canceling the return of the power save control section 21 to the on state.

If the horizontal sync signal and vertical sync signal constant are supplied with stability during the predetermined time period, the power save control section 21 determines that a complete return from the power save mode to the energization mode should be made, and sends out to the power save termination determination circuit 140 a *PSEND signal which means termination of the power save mode.

When the *PSEND signal is input to the reset terminal R of the first flip flop, the output from the first flip flop 10 becomes level 0 to turn off the first transistor 12 and set the coil 11 of the second relay mg2 in the non-energized state, thereby connecting the b contact 4 of the second relay mg2 and connecting the a contact 5 of the first relay mg1 to complete transition to the energization mode. Alternating-current power is then supplied to the power preparation section 7 through the rectifier 6 and streams of control powers are prepared in the power preparation section 7.

This control power is supplied to the display section/ display control section 8, the display mode/parameter setting control section 24 and to the power save control section 21 via the b contact 23 of the third relay mg3 and the reverse current preventing diode 22, thus enabling the display unit to operate for display. The power save control section 21 sends out a reset signal at the time of power-on to perform setting, resetting and initialization of the registers and so on.

The *PSEND signal is also input to the reset terminal R of the third flip flop 17 via the OR gate 14 to set the output Q of the third flip flop 17 to level 0. The second transistor 18 is thereby turned off to set the coil 19 of the third relay mg3 in the non-energized state. The b contact 23 of the third relay mg3 is connected and the a contact 20 of the third relay mg3 is disconnected. As a result, the supply of +5 V auxiliary power from the computer main unit to the power save control section 21 via the VGA connector 9 is stopped.

Thus, the display unit 100 resumes image display.

As described above, in the display unit 100 in this embodiment, the power save termination determination circuit 140 substitutes as the power save control section 21 to detect a command for return to the energization mode. Thus, supply of power to the power save control section 21 is not required in the power save mode. Consequently, the power consumption of the display unit in the power save mode is markedly reduced in comparison with that in the conventional system.

A power save controller of the present invention will next be described.

Figure 4:
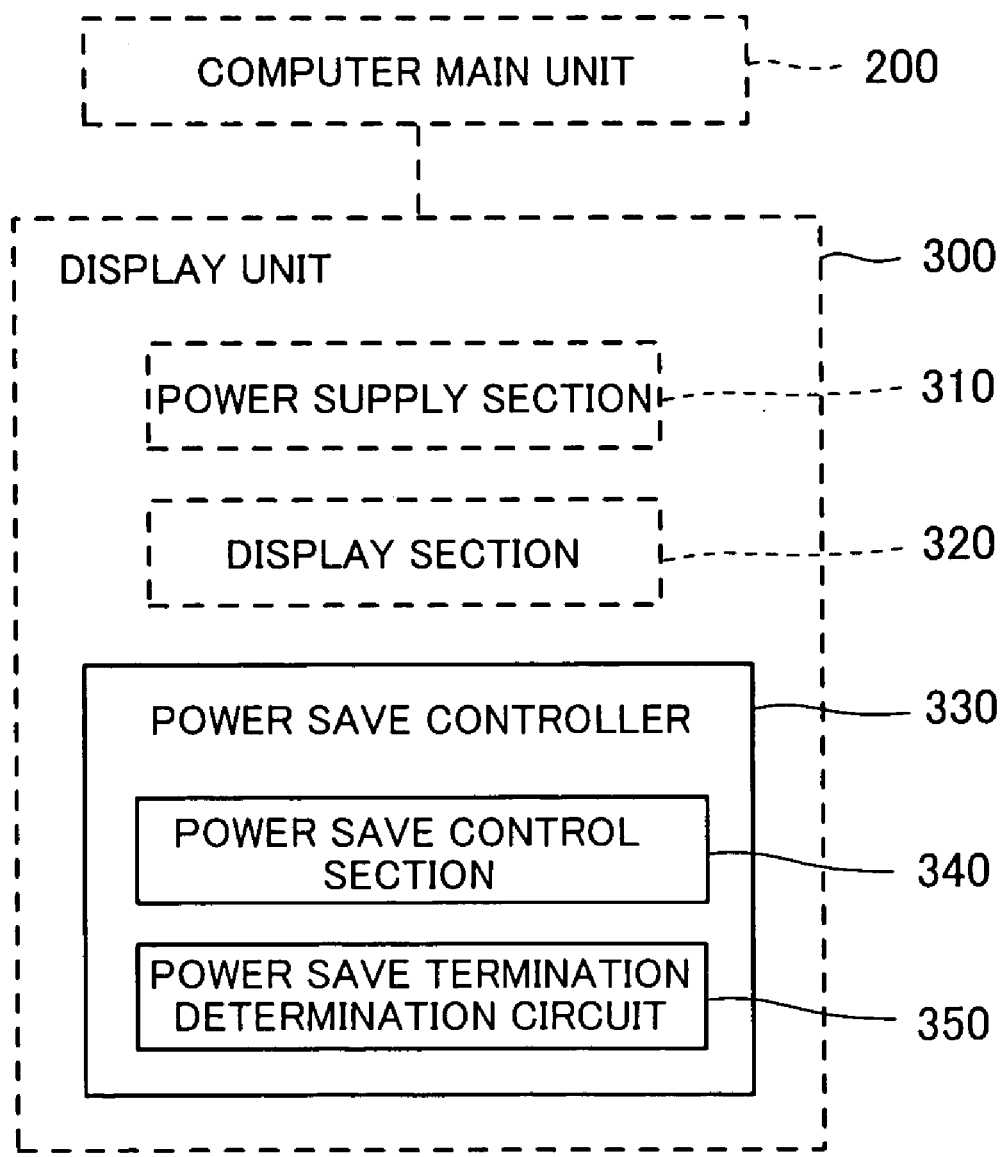
FIG. 4 is a diagram schematically showing an embodiment of a power save controller of the present invention.

FIG. 4 is a diagram schematically showing the configuration of an embodiment of the power save controller of the present invention.

As shown in FIG. 4, this power save controller 330 is a device that controls power supply at the time of power save in a display unit 300 having a display section 320 which displays images on the basis of an image signal supplied from a computer main unit 200, and a power supply section 310 which supplies power to the display section 320. This power save controller 330 has a power save control section 340 and a power save termination determination circuit 350.

The power save control section 340 controls, on the basis of the sync signals, switching between an energization mode in which the power supply section 310 is in an on state and a power save mode in which the power supply section 310 is in an off state. The power save termination determination circuit 350 is driven by auxiliary power for peripheral devices supplied from the computer main unit 200, and substitutes as the power save control section 340 to make a determination on the basis of the sync signals whether or not a return from the power save mode to the energization mode should be made. When the power save termination determination circuit 350 determines that a return to the energization mode should be made, it returns at least the power save control section 340 to the on state. The power save termination determination circuit 350 is arranged so as to operate at a power consumption lower than that at which the power save control section 340 operates.

This power save control section 340 and this power save termination determination circuit 350 have the same configurations as those of the power save control section 130 and the power save termination determination circuit 140 in the display unit 100 described above with reference to FIGS. 2 and 3 and operate in the same manner as the above-described power save control section 130 and power save termination determination circuit 140. Therefore, detailed description of them will not be repeated.

In the above description of each embodiment, an example of auxiliary power supplied from the VGA connector, which is auxiliary power for peripheral devices supplied from the computer main unit to drive the power save termination determination circuit has been described. However, the present invention is not limited to this example. For example, auxiliary power may be supplied from an interface such as a USB connector or a DVI (Digital Visual Interface) connector.

In the above description of each embodiment, an example of use of a mechanical relay having a coil and contacts as each of the first relay mg1, the second relay mg2 and the third relay mg3 has been described. However, a semiconductor switch such as a thyristor or a photocoupler may be used instead of the mechanical relay, because the outputs Q of the first flip flop 10 and the third flip clop 17 are TTL logic outputs capable of controlling the semiconductor switch through a control terminal of the same directly or by means of level conversion.

The rectifier 6 may be directly turned on/off by utilizing the TTL logic outputs from the first flip flop 10 and the third flip clop 17.

While the power save termination determination circuit in this embodiment is arranged to return only the power save control section to the on state at the time of return from the power save mode to the energization mode, the arrangement may alternatively be such that, for example, the entire unit is returned to the on state.

The invention claimed is:

1. A display unit connected to a computer main unit to display images, comprising:
    a power supply section which supplies power to the display unit;
    a display section which performs image display on the basis of an image signal supplied from the computer main unit;
    a power supply control section which controls, on the basis of a sync signal contained in the image signal, switching between an energization mode in which the power supply section is in an on state and a power save mode in which the power supply section is in an off state; and
    a power save termination determination circuit which is driven by auxiliary power for peripheral devices supplied from the computer main unit, which makes a determination on the basis of the sync signal as to whether or not a return from the power save mode to the energization mode should be made, and returns at least the power save control section to the on state in the case of determining that a return to the energization mode should be made, and which has a power consumption lower than that of the power save control section.

2. The display unit according to claim 1, wherein when the power save termination determination circuit determines that a return to the energization mode should be made, it returns the power save control section to the on state by the auxiliary power while maintaining the power supply section in the off state, and
    wherein when the power save control section is returned to the on state by the auxiliary power, the power save control section again makes a determination, on the basis of the sync signal, as to whether or not a return from the power save mode to the energization mode should be made, returns the power supply section to the on state in the case of determining that a return to the energization mode should be made, and cancels the return to the on state by the auxiliary power in the case of determining that the power save mode should be continued.

3. A power save controller used in a display unit having a display section which performs image display on the basis of an image signal supplied from a computer main unit, and a power supply section which supplies power, the power save controller controlling switching between an energization mode in which the power supply section is in an on state and a power save mode in which the power supply section is in an off state, the power save controller comprising:
- a power save control section which controls switching between the energization mode and the power save mode on the basis of a sync signal contained in the image signal; and
- a power save termination determination circuit which is driven by auxiliary power for peripheral devices supplied from the computer main unit, which substitutes as the power save control section to make a determination on the basis of the sync signal whether or not a return from the power save mode to the energization mode should be made, and returns at least the power save control section to the on state in the case of determining that a return to the energization mode should be made, and which has a power consumption lower than that of the power save control section.

* * * * *